United States Patent
Ben-Cnaan

(10) Patent No.: US 9,563,542 B1
(45) Date of Patent: Feb. 7, 2017

(54) IDENTIFYING, QUANTIFYING, AND ELIMINATING WASTED RESOURCES IN SOFTWARE TESTING DUE TO UNAVAILABILITY OF A TESTING ENVIRONMENT

(71) Applicant: Amdocs Software Systems Limited, Dublin (IE)

(72) Inventor: Talmon Ben-Cnaan, Tzur-Yitzhak (IL)

(73) Assignees: Amdocs Development Limited, Limassol (CY); Amdocs Software Systems Limited, Dublin (IE)

( * ) Notice: Subject to any disclaimer, the term of this patent is extended or adjusted under 35 U.S.C. 154(b) by 354 days.

(21) Appl. No.: 14/169,092

(22) Filed: Jan. 30, 2014

Related U.S. Application Data

(60) Provisional application No. 61/773,152, filed on Mar. 6, 2013.

(51) Int. Cl.
  *G06F 11/36* (2006.01)
  *G06Q 10/06* (2012.01)

(52) U.S. Cl.
  CPC .......... *G06F 11/3672* (2013.01); *G06F 11/36* (2013.01); *G06F 11/3664* (2013.01); *G06Q 10/06* (2013.01)

(58) Field of Classification Search
  CPC ... G06F 11/3672; G06F 11/36; G06F 11/3664; G06Q 10/06
  See application file for complete search history.

(56) References Cited

U.S. PATENT DOCUMENTS

| | | | | |
|---|---|---|---|---|
| 5,838,766 A | * | 11/1998 | Rand | H04Q 1/24 370/244 |
| 7,178,063 B1 | * | 2/2007 | Smith | G06F 11/3688 714/38.1 |
| 9,110,496 B1 | * | 8/2015 | Michelsen | G06F 1/00 |
| 9,141,514 B1 | * | 9/2015 | Pavlovitch | G06Q 10/00 |
| 9,268,674 B1 | * | 2/2016 | Ben-Cnaan | G06F 11/3688 |
| 2003/0120825 A1 | * | 6/2003 | Avvari | G06F 9/505 719/316 |
| 2007/0244663 A1 | * | 10/2007 | Haemel | G06F 11/26 702/121 |
| 2011/0093744 A1 | * | 4/2011 | Martinov | G06F 11/3688 714/35 |

* cited by examiner

*Primary Examiner* — Benjamin Wu
(74) *Attorney, Agent, or Firm* — Zilka-Kotab, PC

(57) ABSTRACT

A system, method, and computer program product are provided for identifying, quantifying, and reducing wasted resources in software testing. In use, a first duration of time over which at least one software testing environment was not available for at least one first software testing project is determined. At least one wasted resource amount associated with the first software testing project is calculated, the wasted resource amount resulting from the software testing environment not being available during the first duration of time. A potential saving in software testing effort associated with this project and/or at least one second software testing project is automatically calculated, based, at least partially, on the cause of the unavailability of the testing environment, on the determined first duration of time and the calculated wasted resource amount, the potential saving being achievable by making the software testing environment available for the second software testing project.

18 Claims, 7 Drawing Sheets

IDENTIFYING, QUANTIFYING, AND ELIMINATING WASTED RESOURCES IN SOFTWARE TESTING DUE TO UNAVAILABILITY OF A TESTING ENVIRONMENT

CLAIM OF PRIORITY

This application claims the benefit of U.S. Provisional Application No. 61/773,152, filed Mar. 6, 2013, the entire contents of which are incorporated herein by reference.

FIELD OF THE INVENTION

The present invention relates to identification and quantification of wasted work effort and wasted time, which may occur during a testing period of a typical software development project.

BACKGROUND

Testing of software is a critical step in the software development lifecycle. The objective of the testing is to verify and validate the integration of the software, the hardware and the configuration thereof, and to prevent malfunction of the software when in use.

Software testing is typically performed after the development of the software is completed. Therefore, the software testing period is on the critical path of the software development project. However, the software testing process may suffer from various inefficiencies, which may cause the testing period to extend beyond what was planned, and may cause an increase in the work effort needed to complete the software development project and delay the introduction of the functionality to the users.

One of the major causes of software testing inefficiency and delays is the unavailability of testing environments. For example, a group of software testers may plan to start the testing of a software component on a specific date and plan to complete the testing by a planned date, based on the capacity and the skills of the testing teams assigned to the project.

However, the execution of the test plan may be slowed repeatedly due to unavailability of suitable software testing environments. In many organizations, such delays in software testing are perceived as a given. In other words, down time of environments is a known issue. Currently, the typical software testing process includes waiting until there is a problem, fixing the problem, and continuing the testing until the next problem occurs. There is thus a need for addressing these and/or other issues associated with the prior art.

SUMMARY

A system, method, and computer program product are provided for identifying, quantifying, and reducing wasted resources in software testing. In use, a first duration of time over which at least one software testing environment was not available for at least one first software testing project is determined. Additionally, at least one wasted resource amount associated with the at least one first software testing project is calculated, the at least one wasted resource amount resulting from the at least one software testing environment not being available during the first duration of time. Further, a potential saving in software testing effort associated with this project and/or at least one second software testing project is automatically calculated, based, at least partially, on the cause of the unavailability of the testing environment, on the determined first duration of time and the calculated at least one wasted resource amount, the potential saving being achievable by making the at least one software testing environment available for the at least one second software testing project.

DETAILED DESCRIPTION

Figure 1:
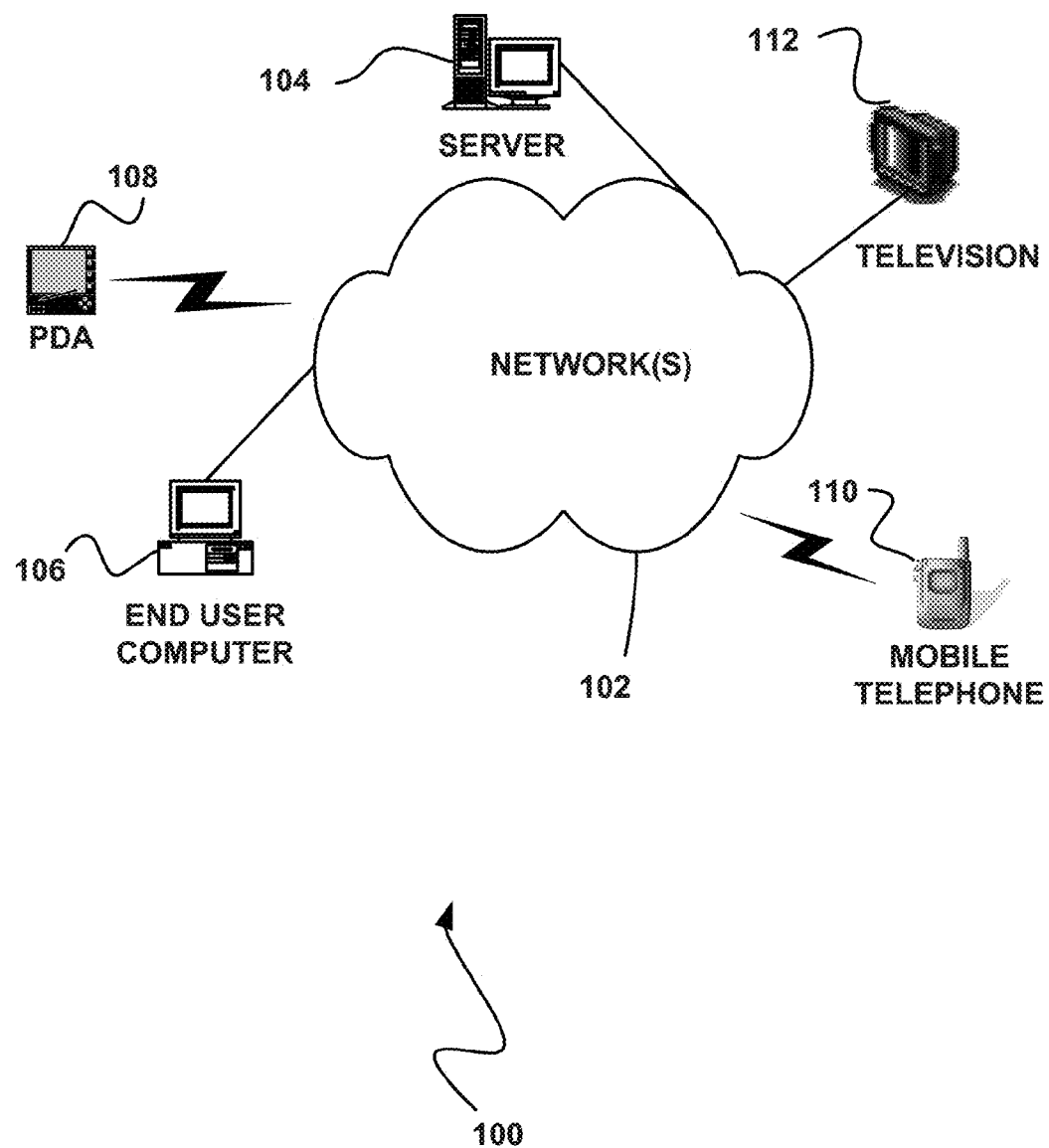
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
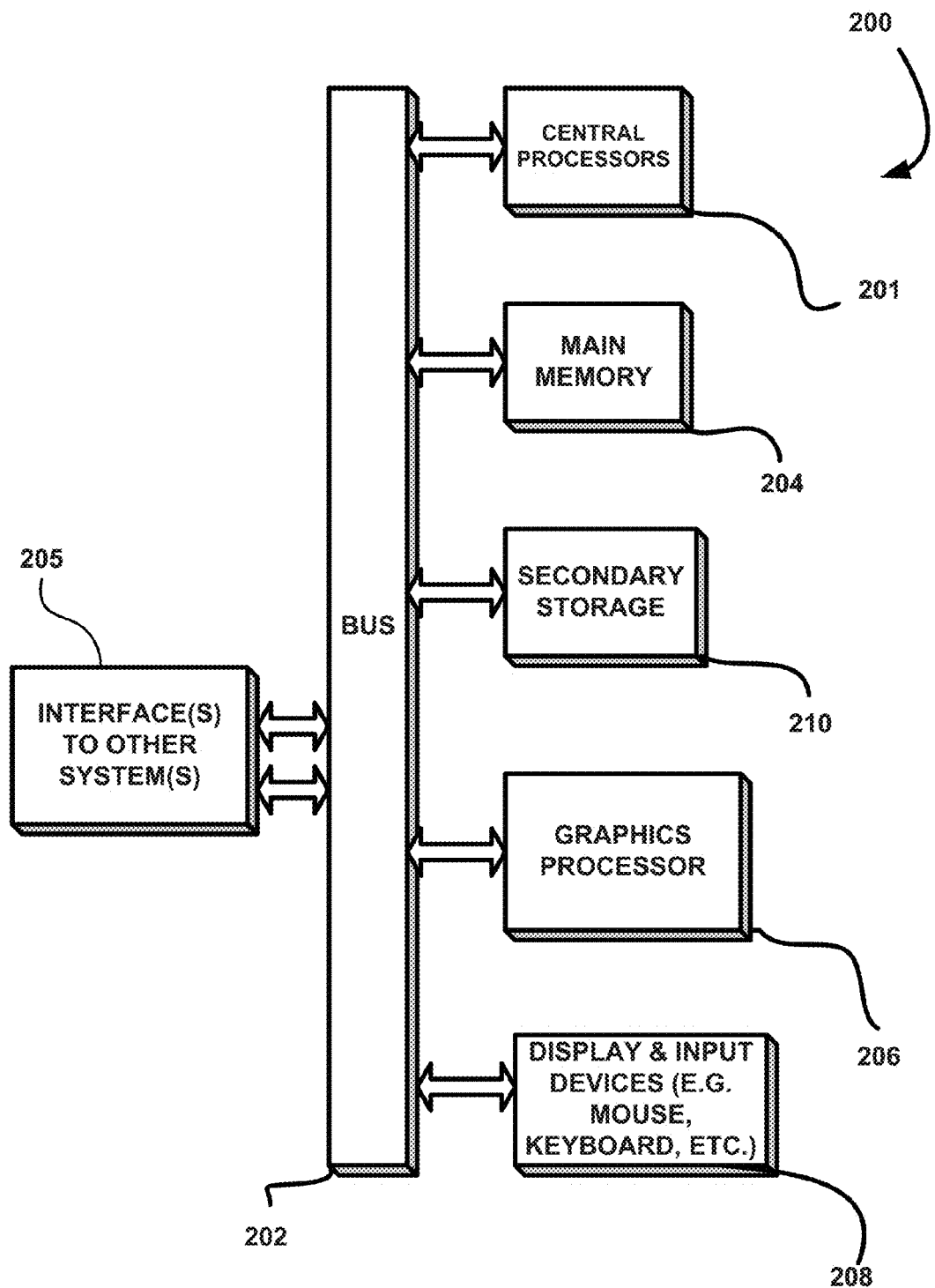
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

The system 200 may have one or more interfaces to one or more systems 205. The system 200 may transfer transactions to the system(s) 205 and/or receive transactions from system(s) 205, and may store data and/or use data that is stored in the main memory and/or the secondary memory of system(s) 205.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 2A:
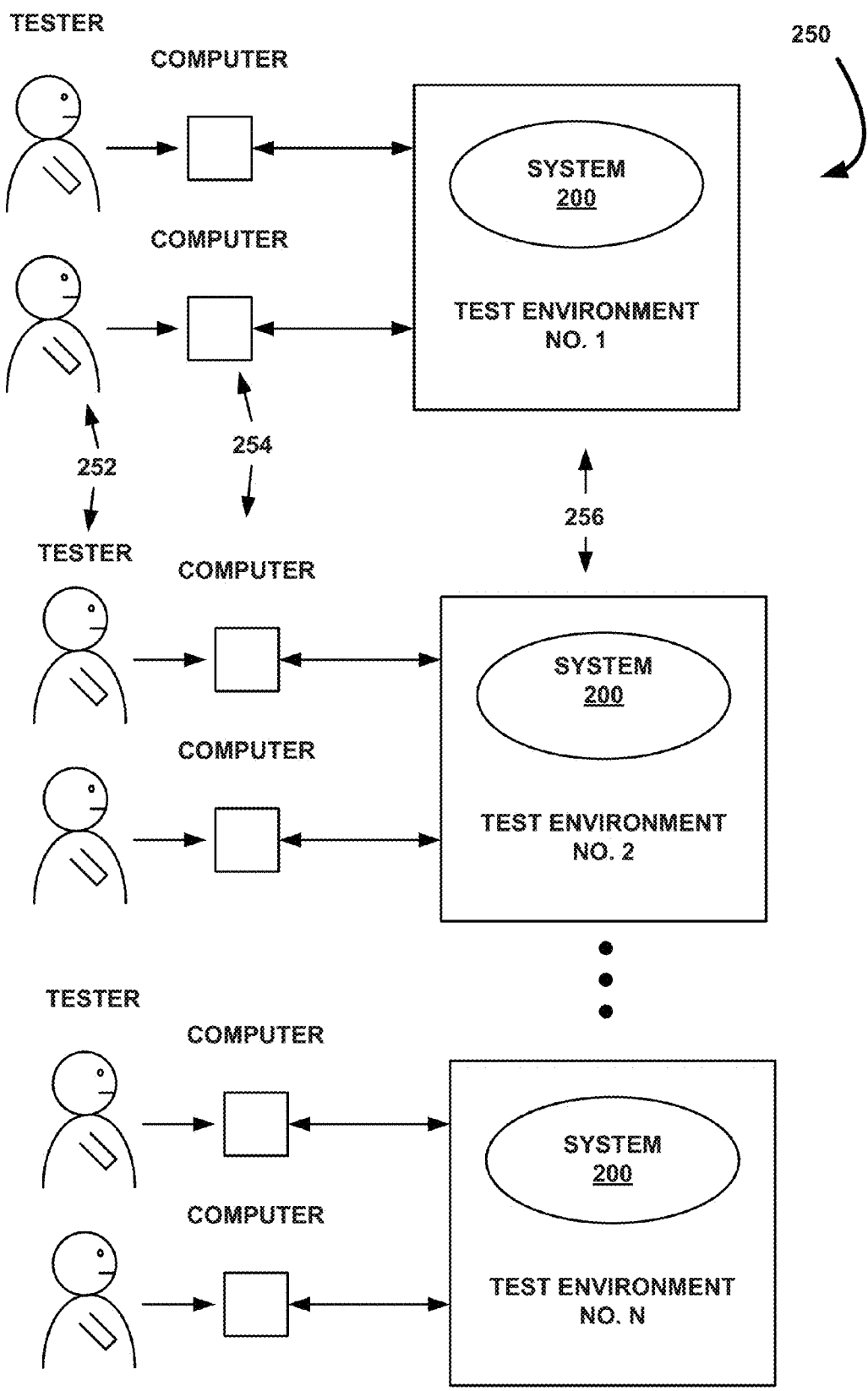
FIG. 2A illustrates a typical set of test environments, in accordance with one embodiment.

FIG. 2A illustrates a typical set of test environments 256, in accordance with one embodiment. The system 200 of FIG. 2 (or part of it) may be installed on each of the test environments 256. Testers 252 are using computers 254 and may use the system 200 to verify and validate that the system operates as required.

Figure 3:
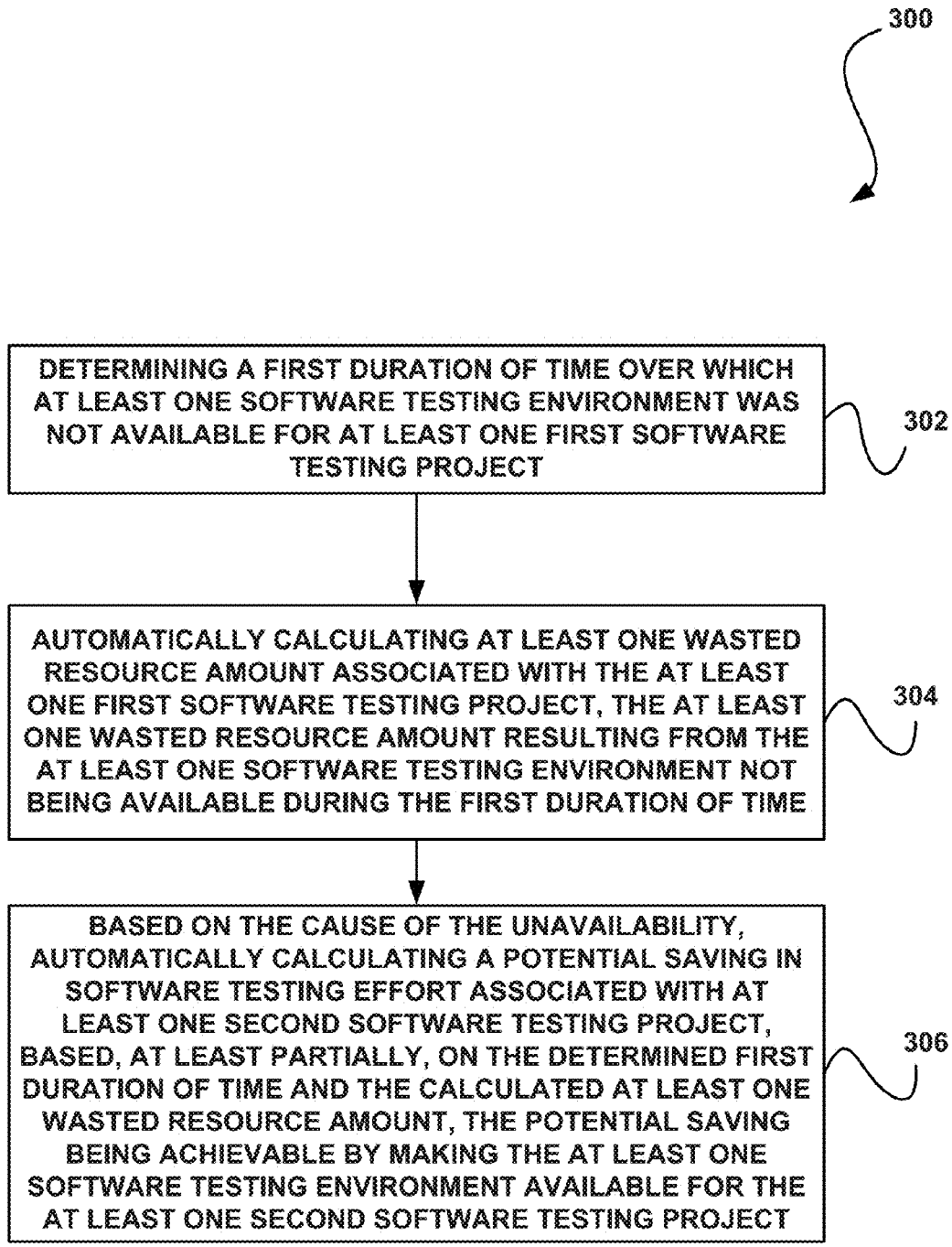
FIG. 3 illustrates a method for identifying, quantifying, and reducing wasted resources in software testing, in accordance with one embodiment.

FIG. 3 illustrates a method 300 for identifying, quantifying, and reducing wasted resources in software testing, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown, a first duration of time over which at least one software testing environment was not available for at least one first software testing project is determined. See operation 302. In the context of the present description, a software testing environment refers to any hardware and/or software platform, or combination thereof, which is capable of being utilized to test software (e.g. a software release, a portion of a software release, etc.).

Further, a software testing project may include any test associated with software. For example, in one embodiment, the software testing project may include testing a software release. In another embodiment, the software testing project may include testing a portion of a software release. In another embodiment, the software testing project may include troubleshooting and/or debugging software and/or computer code.

As shown further in FIG. 3, at least one wasted resource amount associated with the at least one first software testing project is automatically calculated. In this case, the at least one wasted resource amount results from the at least one software testing environment not being available during the first duration of time. See operation 304.

In the context of the present description, a wasted resource amount refers to an amount of a resource that is wasted. For example, in one embodiment, the wasted resource amount may include wasted work effort (e.g. wasted man hours, wasted machine hours, wasted laboratory hours, etc.). Additionally, in one embodiment, the wasted resource amount may include wasted time (e.g. a wasted duration of time in minutes, hours, days, weeks, months, years, etc.).

The software testing environment may not be available for various reasons. For example, in one embodiment, the software testing environment may not be available because of a latency in delivering ready-to-use testing environments. As another example, the software testing environment may not be available because of instability of the testing environments after they are delivered. As another example, the software testing environment may not be available because of environment defects (e.g. missing data, missing files, etc.) during the testing period, and after the environment was stabilized. In either case, the downtime attributed to the testing environment not being available may cause a waste of resources, such as work effort and time.

As shown further in FIG. 3, a potential saving in software testing effort associated with at least one second software testing project is automatically calculated, based, at least partially, on the determined first duration of time and the calculated at least one wasted resource amount. See operation 306. In one embodiment, the potential may be achievable by improving the availability of at least one software testing environment for the at least one second software testing project.

For example, by estimating the amount of time a testing environment may be unavailable, and by identifying the potential resources idle time as a result of this lack of availability, a potential savings of the resources (e.g. cost, time, work effort, etc.) may be identified. Further, the potential savings may be realized by improving the availability of the software testing, such that the resources are not wasted.

Accordingly, in one embodiment, the wasted resources which result from low availability of testing environments associated with a current or past testing project may be calculated. Further, the potential saving that can be achieved when testing environments are better managed may be calculated. Moreover, the actual saving after improvement steps were taken may be verified. For example, in one embodiment, an amount of time and/or work effort that has been invested in the software testing project may be determined, after the improvement steps were taken, to determine the actual saving.

In one embodiment, the wasted resource amount may include an amount of the resource (e.g. work effort, etc.) that cannot be fully utilized when a software testing environment is not available for a first duration of time. For example, the wasted resource amount may include an amount of idle time of testers due to the test environment being down. In one embodiment, a duration that the software testing environment will not be available for the second software testing project may be estimated, based on the time the environments were down in the past.

In one embodiment, the second duration the at least one software testing environment will not be available for the at least one second software testing project may be estimated based at least partially on the determined first duration of time. For example, the duration of time the testing environment may not be available for the second testing project may be estimated based on the amount of time the testing environment was not available for the first testing project. In various embodiments, the first testing project may be associated with the second testing project, the second testing project may include aspects of the first testing project, at least a portion of software may be common and/or similar between the first testing project and the second testing project, and/or the tests associated with the first testing project or the second testing project may be common and/or similar.

In one embodiment, the potential saving in software testing effort associated with the at least one second software testing project may be calculated based, at least partially, on the estimated second duration of time, number of test environments and number of testers. Further, in one embodiment, automatically calculating the potential saving in software testing effort associated with the at least one second software testing project may include calculating a potential amount of work effort saving associated with the at least one second software testing project, due to the at least one software testing environment being available. In another embodiment, automatically calculating the potential saving in software testing effort associated with the at least one second software testing project may include calculating a potential amount of time saving associated with the at least one second software testing project, due to the at least one software testing environment being available.

As an option, improving the availability of the software testing environments may include reducing the first duration of time in which the software testing environment is unavailable. In one embodiment, this may be accomplished by improving the planning and the management of the delivery time of the testing environments to testers. For example, by adding a task of test environments quality assurance to the plan of environments delivery, assign responsible person to this task and add the time to perform the quality assurance task to the plan of test environment delivery. In another embodiment, the duration of downtime may be reduced by stabilizing the test environment in a shorter period of time. In another embodiment, the duration of downtime may be reduced by shortening a maintenance time associated with the test environment.

Still yet, in one embodiment, the method 300 may include verifying actual saving after improvement steps were taken. For example, based on user feedback (e.g. via a GUI, etc.) about a first testing project associated with one or more testing environments, wasted resources may be identified, along with a cause of the wasted resources (e.g. test environment maintenance during optimal work hours). Based on this identification, steps may be taken to eliminate or mitigate the cause of the wasted resources. In one embodiment, user feedback (e.g. through a questionnaire GUI, etc.) may be utilized to verify saving.

In one embodiment, a monetary cost associated with the potential saving may be determined. Further, in one embodiment, a return on investment (ROI) may be determined, based on the potential saving and the determined monetary cost.

As an option, the method 300 may further include causing display of a questionnaire for capturing a current status of a project. In various embodiments, the current status of the project may include a number of testers associated with the project, a number of software environments, the duration of the testing stage, and/or various other inputs. In this case, in one embodiment, automatically calculating the at least one wasted resource amount associated with the at least one first software testing project may include receiving input from at least one user presented with the questionnaire.

Still yet, in one embodiment, the method 300 may include ascertaining a number of software testing environments in a software testing organization. In one embodiment, the number of software testing environments may be provided via a user interface (e.g. and user input, etc.). In another embodiment, the number of software testing environments may be provided automatically (e.g. via an availability calendar, a resource list/calendar, etc.).

In another embodiment, a number of software testers who could have potentially utilized the at least one testing environment during the duration of time may be ascertained. In one embodiment, the number of software testers who could have potentially utilized the at least one testing environment may be provided via a user interface. In another embodiment, the number of software testers who could have potentially utilized the at least one testing environment may be provided automatically (e.g. via an availability calendar, a resource list/calendar, etc.).

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
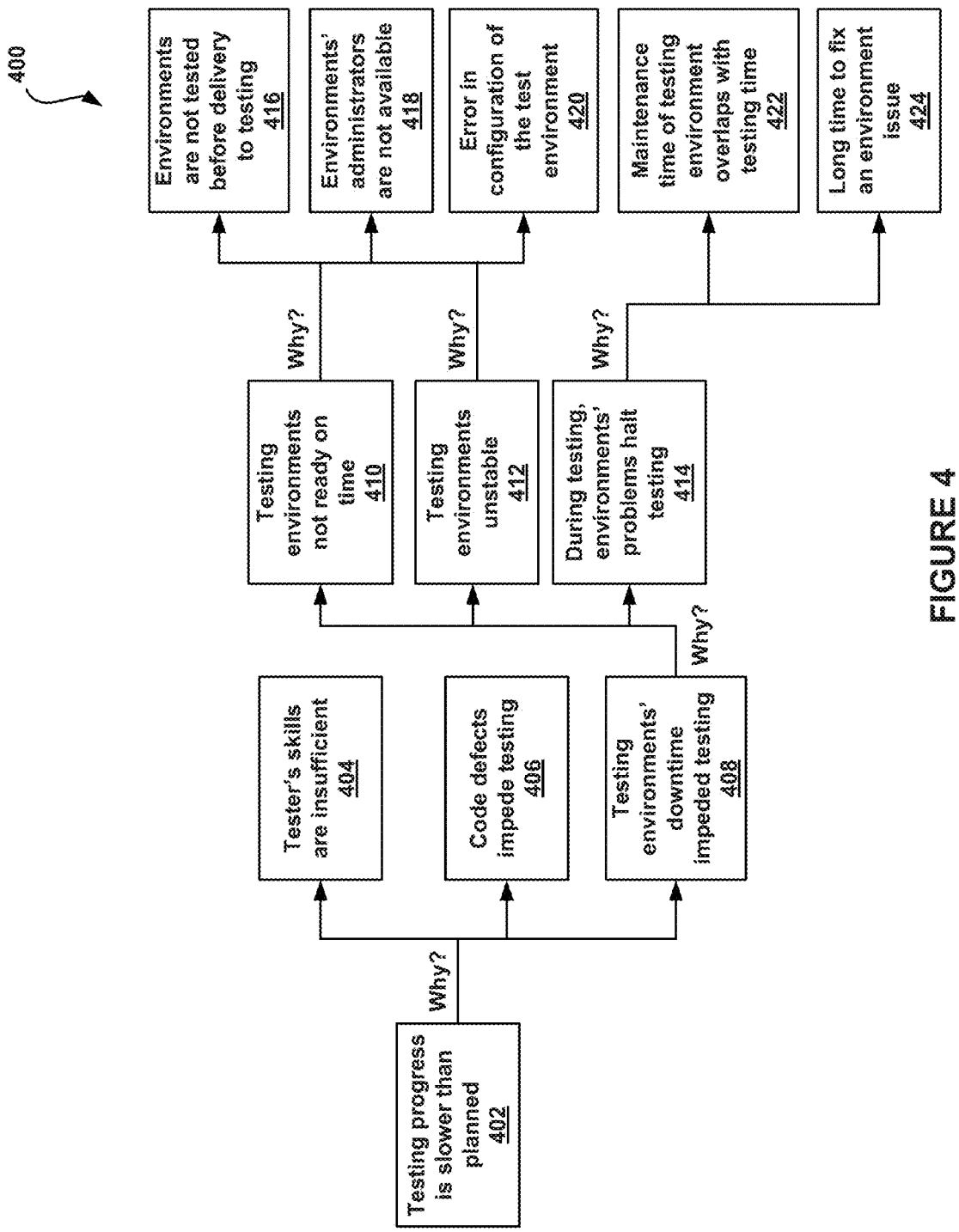
FIG. 4 illustrates a flow diagram for causal analysis of delays and budget overrun in software testing, in accordance with one embodiment.

FIG. 4 illustrates a flow diagram 400 for causal analysis of delays and budget overrun in software testing, in accordance with one embodiment. As an option, the diagram 400 may be implemented in the context of the details of FIGS. 1-3. For example, the flow diagram 400 may be implemented by a client device or server, etc. that allows inputs for answering queries associated with causal analysis, as described below in more detail. Of course, however, the flow diagram 400 may be implemented in the context of any desired environment. Further, the aforementioned definitions may equally apply to the description below.

As shown as one example for a causal analysis flow diagram, it is determined that testing progress is slower than planned. See determination 402. This may be determined based on a variety of factors, such as missed milestones, user feedback, and/or various other factors. Further, it is determined why the testing progress is slower than planned. In one embodiment, a user may provide feedback indicating the reason why the progress is slower than planned. For example, a questionnaire may be presented to a user in the form of a user interface that may step through questions associated with the causal analysis.

As shown, in various embodiments, the testing progress may be slower than planned because the tester's skills are insufficient (see determination 404), code defects are impeding testing (see determination 406), and/or for various other reasons. In one embodiment, a user may be presented with a list of reasons from which to select (e.g. via a user interface, etc.). In another embodiment, a user may have the ability to input a reason into a user interface as an input option.

As shown further, in one embodiment, the reason the testing progress is slower than planned may be because of downtime of the testing environment. See determination 408. In this case, a user may be queried as to why the testing environments' downtime contributed to the slower than planned progress.

In various embodiments, it may be determined that the testing environments' downtime contributed to slower than planned testing progress because the testing environments were not ready on time (see determination 410), or the testing environments were unstable (see determination 412), or problems with the testing environments occurred during testing (see determination 414), and/or various other reasons.

Further, the causal analysis may drill down further to determine reasons for the testing environments' downtime. As shown, such reasons may include the environments not being tested adequately before delivery (see determination 416), unavailability of administrators associated with the environments (see determination 418), errors in configuration of the test environment (see determination 420), maintenance time of testing environments overlapping with the testing time (see determination 422), time due to fixing an environments' issue (see determination 424), and/or various other reasons.

Utilizing information obtained as a result of implementing the flow diagram 400, or a similar process, wasted resources that result from low availability of testing environments may be calculated. Additionally, in one embodiment, a measurement tool may be provided for calculating the potential saving that can be achieved when testing environments are better managed. Moreover, the actual saving realized after improvement steps were taken may be verified.

Figure 5:
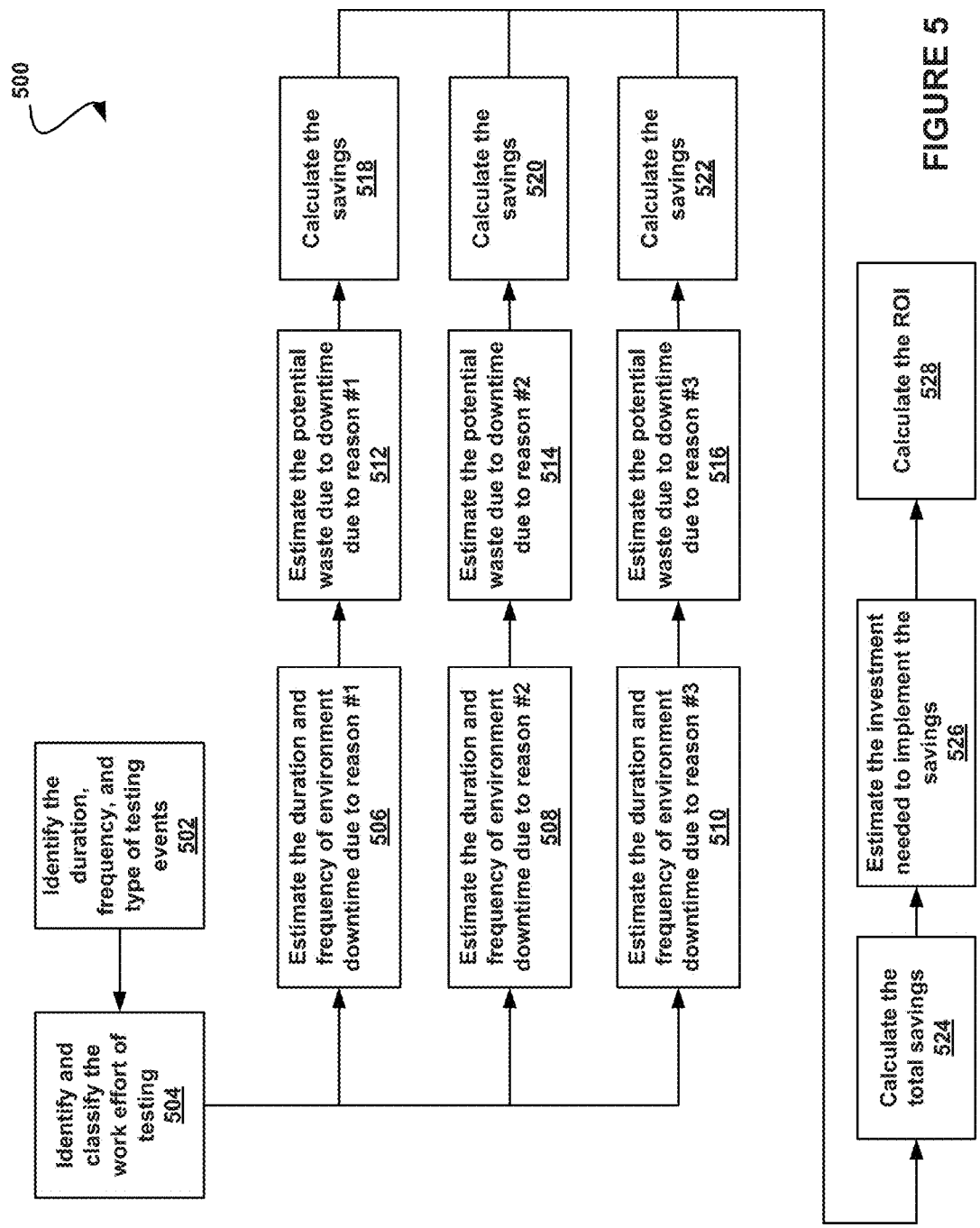
FIG. 5 illustrates a method for identifying, quantifying, and reducing wasted resources in software testing, in accordance with another embodiment.

FIG. 5 illustrates a method 500 for identifying, quantifying, and reducing wasted resources in software testing, in accordance with another embodiment. As an option, the method 500 may be implemented in the context of the details of FIGS. 1-4. Of course, however, the method 500 may be implemented in the context of any desired environment. Further, the aforementioned definitions may equally apply to the description below.

As shown in FIG. 5, duration, frequency, and the type of testing events associated with a testing project are identified. See operation 502. Further, a work effort associated with the testing is identified and classified. See operation 504.

As shown further, the duration and frequency of a downtime associated with a testing environment(s), due to various reasons, is estimated. See operations 506, 508, and 510. The reasons may include any reason (e.g. input and/or described by a user, etc.). Furthermore, any number of reasons may be considered (i.e. not necessarily three reasons, etc.). As an example, the reasons for testing delay described in the context of FIG. 4 may be considered.

In one embodiment, a questionnaire may be presented to a user for capturing the current status of a project, which may include, for example, the number of testers, the number of environments, and the number of software releases. Further, in one embodiment, a list of typical areas of wasted effort may be presented to a user (e.g. in the form of a user interface, etc.). As noted, one example of causal analysis of the waste is shown in FIG. 4 (and is described in further detail below,).

Still yet, in one embodiment, a questionnaire for assessing the current waste and the potential saving may be presented to a user. In the context of the present description, the information gathered in these questionnaires is referred to generally as inputs. In one embodiment, a calculator may be utilized that formulates the information that was collected by the techniques described herein and calculates the current waste (e.g. in terms of work effort and a monetary equivalence, etc.), the potential saving, and the return on investment needed in order to achieve actual savings, etc.

In this way, actual data as experienced by the software development project's managers and team members may be captured, and a system may be utilized to identify how much cost and time can be saved.

Various data may be captured in order to identify how much cost and time may be saved. For example, the amount of work effort and time that are invested in the current projects may be identified (e.g. see operation 502 of FIG. 5, etc.). In this case, in various embodiments, the following information may be captured: the number of testers doing test execution in a major software release (TRm); the number of major software releases per year (NRm); the average duration of testing the major release, in weeks (Dm); the number of testing environments of a major release (Em); the number of testers doing test execution in a minor release (TRn); the number of minor releases per year (NRn); the average duration of testing the minor release (Dn); the number of testing environments of a minor release (En); the number of testers doing test execution in a small release (TRs); the number of small releases per year (NRs); the average duration of testing the small release (Ds); the number of testing environments of a small release (Es); the average time to set-up a testing environment (ESU); the average time to fix an environment defect, e.g. a problem with the set-up, etc. (EFT); the time the environment is down for maintenance (EMT); and the average working hours per day of one tester (HPD), etc.

Further, the association of this work effort to the testing environments may be identified (e.g. see operation 504 of FIG. 5, etc.). Accordingly, the average testing work effort per hour (EWH) may be determined.

Table 1 shows a summary of abbreviations correlated with information descriptors, which may be used to calculate saving and related data, in accordance with one embodiment. The abbreviations are used for ease of describing formulas for calculation.

TABLE 1

| | |
|---|---|
| TRm | Number of testers doing test execution in a Major release |
| NRm | Number of major releases per year |
| Dm | Average duration of testing the major release, in weeks |
| Em | Number of testing environments of a major release |
| TRn | Number of testers doing test execution in a minor release |
| NRn | Number of minor releases per year |
| Dn | Average duration of testing the minor release |
| En | Number of testing environments of a minor release |
| TRs | Number of testers doing test execution in a small release |
| NRs | Number of small releases per year |
| Ds | Average duration of testing the small release |
| Es | Number of testing environments of a small release |
| ESU | Average time to set-up a testing environment |
| EFT | Average time to fix an environment defect (problem with the set-up) |
| EMT | Time the environment is down for maintenance |
| HPD | Average working hours per day of one tester |
| EWH | Average testing work effort per hour |
| EWHm | Average number of testers per one testing environment (major release) |
| EWHn | Average number of testers per one testing environment hour (minor release) |
| EWHs | Average number of testers per one testing environment hour (small release) |
| YEm | Wasted effort per year due to one hour of down time (major release) |
| YEn | Wasted effort per year due to one hour of down time (minor release) |
| YEs | Wasted effort per year due to one hour of down time (small release) |
| ADm1 | Average delay in major releases |
| ADn1 | Average delay in minor releases |
| ADs1 | Average delay in small releases |
| YW1 | Yearly waste corresponding to reason #1 |
| YW2 | Yearly waste corresponding to reason #2 |
| YW3 | Yearly waste corresponding to reason #3 |
| S | Percent of effort that can be saved |
| DPW | Environment defects per week |
| DPW2 | Reduced number of environment defect per week (DPW > DPW2) |
| DPWm | Environment defects per week in a major release |
| DPWn | Environment defects per week in a minor release |
| DPWs | Environment defects per week in a small release |
| TTFB | Average time to fix an environment defect(s) |
| TTFA | Reduced average time to fix an environment defect(s) (TTFB > TTFA) |
| DPW2 | Reduced number of environment defect per week |
| ESm | Number of environments used in the period of stabilization |

For a major release, EWHm=TRm/Em. Similarly, EWHn=TRn/En and EWHs=TRs/Es for minor and small releases.

The wasted effort when one testing environment is unavailable is EWHm for a major release and similarly, EWHn and EWHs for minor and small releases.

The wasted effort per year due to one hour of down time is $YEm=EWHm*NRm$, $YEn=EWHn*NRn$, $YEs=EWHs*NRs$, when down time occurs in a major, minor, and small release.

Using this information, the calculator (e.g. a system including computer code, etc.) can calculate how many work hours are unproductive when a test environment is not available for one hour.

The current down time of testing environments due to various reasons is then estimated (see operations 506, 508, and 510 of FIG. 5). As an example, a first reason (e.g. reason #1 of operation 506) may include latency in delivering ready-to-use testing environments (e.g. see determination 410 of FIG. 4). In this case, a first user input (e.g. Input 1, etc.) may include a most probable delay, in hours or days, etc. A second input (e.g. Input 2, etc.), may include top cases of delays in the last year and a third input may include least cases of delays in the last year. In one embodiment, both of these inputs may be estimated for each type of release. In another embodiment, the delays due to reason #1 (in hours or days etc.,) can be collected by a reporting systems or other means for counting work effort, and an average delay can be calculated automatically.

Accordingly, in one embodiment, the average delay in major releases (ADm1) may be calculated as [(least cases)+4*(most probable)+(top cases)]/6. (Also known as PERT technique). The yearly waste may be calculated as $YW1=ADm1*Em*EWHm*NRm+ADn1*En*EWHn*NRn+ADs1*Es*EWHs*NRs$. With proper management, all of this waste may be prevented. Therefore, the saving equals waste (YW1).

As another example, a second reason (e.g. reason #2 of operation 508) may include the instability of the testing environments after they are delivered (e.g. see determination 412 of FIG. 4, etc.). In this case, a first user input (e.g. Input 1, etc.) may include a most probable delay, in hours or days. A second and third inputs (e.g. Input 2, etc.), may include top cases and least cases of delays in the last year. In one embodiment, these inputs may be estimated for each type of release. In this case, the average delay in major releases (ADm2) may be calculated as [([(least cases)+4*(most probable)+(top cases))]/6.

A third input (e.g. Input 3, etc.) may indicate a number of environments that are used in the period of stabilization (ESm). In one embodiment, the method may assume that the stabilization problems are identified and fixed on part of the testing environments, and then the working configuration is copied to the other testing environments. In one embodiment, the system may propose as a user recommendation: when Em=4 or less, ESm=1; when Em>4 and <20, ESm=roundup(Em)/4, etc.

The yearly waste (e.g. from operation 514) is calculated as $YW2=ADm1*ESm*EWHm*NRm+ADn1*ESm*EWHn*NRn+Ads1*ESm*EWHs*NRs$. Additional waste includes the work effort to fix the problems. This effort may be calculated using a similar algorithm.

With proper management, some of this waste can be saved. For example, the percent of effort that can be saved may be represented by "S". Therefore, the saving=S*YW2/100.

As another example, a third reason (e.g. reason #3 from operation 510) may include environment defects (e.g. missing data, missing files etc.) present during the testing period after the environment was stabilized. In this case, a first input (e.g. Input 1, etc.) may include the amount of the environment defects per week (DPW). In one embodiment, this may be calculated using a most probable and/or top cases of defects per week.

A second input (e.g. Input 2, etc.) may include the average time to fix an environment defect (TTFB). The yearly waste may be calculated as $YW3=DPWm*Dm*TTFB*EWHm+DPWn*Dn*TTFB*EWHn+DPWs*Ds*TTFB*EWHs$. Saving mat be achieved by reducing the average time to fix from TTFB to TTFA (TTFB>TTFA). Saving may also be achieved by reducing the number of environment defect per week from DPW to DPW2. Therefore, saving (e.g. from operation 522) is $YW3*(1-TTBA,TTBF)*(1(DPW2/DPW))$.

The potential techniques or steps to reduce the testing environment down-time and the potential reduction of this downtime may then be determined. Using this information, the system may calculate the current work effort and the current waste that result from testing environment down time; future work effort and future waste, after a plan to reduce the identified waste was implemented; the saving; and the ROI, which is the saving, divided by the investment needed to achieve the saving.

In this way, a system may associate the environment common issues with their impact on the testing work effort and duration. Further, the system may be utilized to translate approximate data as users have experienced, without the need for accurate (but costly) measurements.

Figure 6:
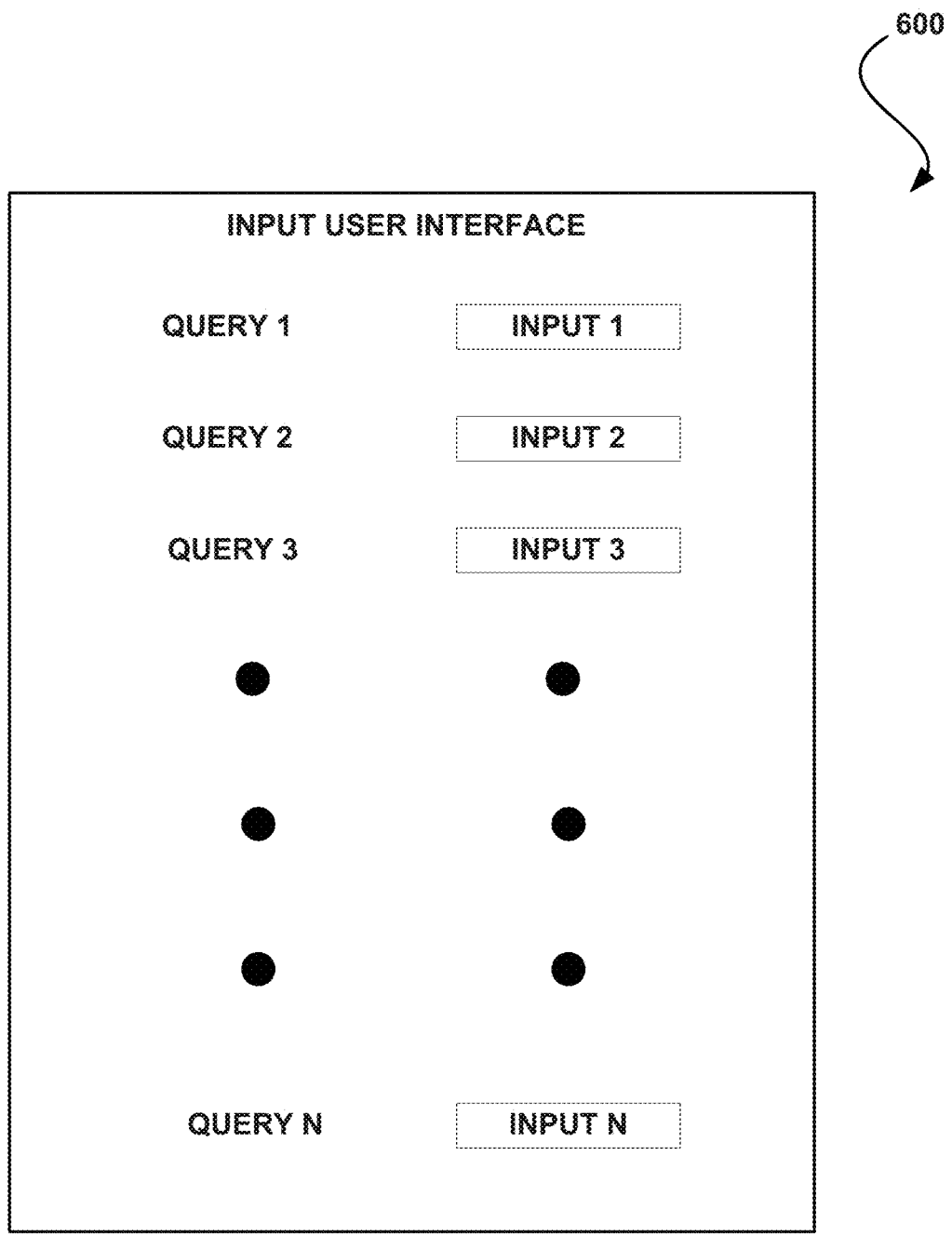
FIG. 6 illustrates a user interface for receiving information for identifying, quantifying, and reducing wasted resources in software testing, in accordance with one embodiment.

FIG. 6 illustrates a user interface 600 for receiving information for identifying, quantifying, and reducing wasted resources in software testing, in accordance with one embodiment. As an option, the interface 600 may be implemented in the context of the details of FIGS. 1-5. Of course, however, the interface 600 may be implemented in the context of any desired environment. Further, the aforementioned definitions may equally apply to the description below.

In operation, the user interface 600 may function to present a user with questions and to receive input from which a system may use to identify, quantify, and reduce wasted resources in software testing. In one embodiment, the user interface 600 may function to receive input for causal analysis (e.g. associated with the flow diagram of FIG. 4, etc.). Further, in one embodiment, the user interface 600 may function to query a user for input (e.g. input described in the context of FIG. 5, etc.) that may be used to implement functionality described herein.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
   computer code for determining, by a computer system, a first duration of time over which at least one software testing environment was not available for at least one first software testing project;
   computer code for calculating, by the computer system, at least one wasted resource amount associated with the at least one first software testing project, the at least one wasted resource amount resulting from the at least one software testing environment not being available during the first duration of time;
   computer code for automatically calculating, by the computer system, a potential saving in software testing effort associated with at least one second software testing project, based, at least partially, on the determined first duration of time and the calculated at least one wasted resource amount, the potential saving being achievable by making the at least one software testing environment available for the at least one second software testing project;

computer code for identifying, by the computer system, a cause of the at least one wasted resource amount;

computer code for eliminating or reducing, by the computer system, the identified cause of the at least one wasted resource amount;

computer code for verifying, by the computer system, an actual saving in the software testing effort associated with an execution the at least one second software testing project using the at least one software testing environment, after eliminating or reducing the identified cause of the at least one wasted resource amount.

2. The computer program product of claim 1, further comprising computer code for determining an amount of at least one resource that is invested in the at least one first software testing project.

3. The computer program product of claim 2, wherein the computer program product is operable such that the at least one resource includes work effort associated with the at least one first software testing project.

4. The computer program product of claim 3, wherein the computer program product is operable such that the at least one resource further includes a duration of time associated with the at least one first software testing project.

5. The computer program product of claim 4, further comprising computer code for associating the work effort and the duration of time with the at least one software testing environment.

6. The computer program product of claim 1, further comprising estimating a second duration of time the at least one software testing environment will not be available for the at least one second software testing project.

7. The computer program product of claim 6, wherein the computer program product is operable such that the second duration of time the at least one software testing environment will not be available for the at least one second software testing project is estimated based at least partially on the determined first duration of time.

8. The computer program product of claim 6, wherein the computer program product is operable such that the potential saving in software testing effort associated with the at least one second software testing project is calculated based, at least partially, on the estimated second duration of time.

9. The computer program product of claim 1, wherein the computer program product is operable such that automatically calculating the potential saving in software testing effort associated with the at least one second software testing project includes calculating a potential amount of work effort saving associated with the at least one second software testing project, due to the at least one software testing environment being available.

10. The computer program product of claim 1, wherein the computer program product is operable such that automatically calculating the potential saving in software testing effort associated with the at least one second software testing project includes calculating a potential amount of time saving associated with the at least one second software testing project, due to the at least one software testing environment being available.

11. The computer program product of claim 1, wherein the computer program product is operable such that making the at least one software testing environment available includes reducing the first duration of time.

12. The computer program product of claim 1, further comprising computer code for determining a monetary cost associated with the potential saving.

13. The computer program product of claim 12, further comprising computer code for determining a return on investment (ROI), based on the potential saving and the determined monetary cost.

14. The computer program product of claim 1, further comprising causing display of a questionnaire for capturing a current status of the at least one first software testing project, wherein the current status of the at least one first software testing project includes at least a testing effort associated with the at least one first software testing project, a number of software environments available, and number of software releases associated with the at least one first software testing project.

15. The computer program product of claim 14, wherein the computer program product is operable such that automatically calculating the at least one wasted resource amount associated with the at least one first software testing project includes receiving input from at least one user presented with the questionnaire.

16. The computer program product of claim 1, further comprising:

computer code for ascertaining a number of software testing environments in a software testing organization;

computer code for ascertaining a number of software testers who could have potentially utilized the at least one testing environment during the duration of time;

computer code for automatically calculating a number of software projects of the at least one second software project which could have potentially been tested in the at least one testing environment during the duration of time; and computer code for, responsive to determining the first duration of time, ascertaining the number of software testers, and calculating a number of software projects, automatically calculating the potential saving in software testing effort of the software projects.

17. A method, comprising:

determining, by a computer system, a first duration of time over which at least one software testing environment was not available for at least one first software testing project;

calculating, by the computer system, at least one wasted resource amount associated with the at least one first software testing project, the at least one wasted resource amount resulting from the at least one software testing environment not being available during the first duration of time;

automatically calculating, by the computer system, a potential saving in software testing effort associated with at least one second software testing project, based, at least partially, on the determined first duration of time and the calculated at least one wasted resource amount, the potential saving being achievable by making the at least one software testing environment available for the at least one second software testing project;

identifying, by the computer system, a cause of the at least one wasted resource amount;

eliminating or reducing, by the computer system, the identified cause of the at least one wasted resource amount;

verifying, by the computer system, an actual saving in the software testing effort associated with an execution the at least one second software testing project using the at least one software testing environment, after eliminating or reducing the identified cause of the at least one wasted resource amount.

18. A computer system comprising:

a memory system; and one or more processing cores coupled to the memory system and that are each configured to:

determine, by the computer system, a first duration of time over which at least one software testing environment was not available for at least one first software testing project;

calculate, by the computer system, at least one wasted resource amount associated with the at least one first software testing project, the at least one wasted resource amount resulting from the at least one software testing environment not being available during the first duration of time;

automatically calculate, by the computer system, a potential saving in software testing effort associated with at least one second software testing project, based, at least partially, on the determined first duration of time and the calculated at least one wasted resource amount, the potential saving being achievable by making the at least one software testing environment available for the at least one second software testing project;

identify, by the computer system, a cause of the at least one wasted resource amount;

eliminate or reduce, by the computer system, the identified cause of the at least one wasted resource amount;

verify, by the computer system, an actual saving in the software testing effort associated with an execution the at least one second software testing project using the at least one software testing environment, after eliminating or reducing the identified cause of the at least one wasted resource amount.

* * * * *